Figure 1:
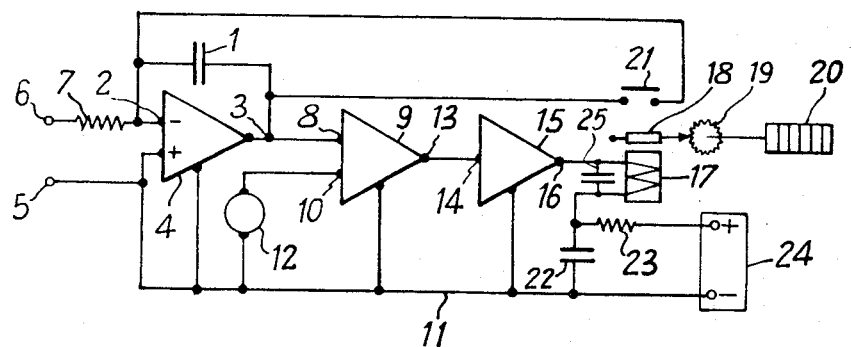

United States Patent [19]
Hadida

[11] 3,818,204
[45] June 18, 1974

[54] VOLTAGE INTEGRATING APPARATUS
[75] Inventor: Roger Hadida, Paris, France
[73] Assignee: Societe Ben Societe Anonyme, Marseille, France
[22] Filed: Jan. 13, 1972
[21] Appl. No.: 217,609

[30] Foreign Application Priority Data
Jan. 15, 1971 France .............................. 71.1264

[52] U.S. Cl. .......... 235/183, 235/92 C, 235/92 NT, 328/127
[51] Int. Cl............................................. G06g 7/18
[58] Field of Search .............. 340/347 NT; 328/127; 324/99, 111; 320/1; 235/92 C, 92 NT, 183

[56] References Cited
UNITED STATES PATENTS

| | | | |
|---|---|---|---|
| 3,147,917 | 9/1964 | Wehrli et al. ...................... | 235/92 C |
| 3,322,937 | 5/1967 | O'Brien............................. | 235/92 C |
| 3,439,272 | 4/1969 | Bailey............................ | 340/347 NT |
| 3,597,760 | 8/1971 | Fox et al. ....................... | 235/92 NT |
| 3,609,542 | 9/1971 | Burke .................................. | 320/1 |
| 3,621,207 | 11/1971 | Bass................................. | 235/92 C |

Primary Examiner—Felix D. Gruber
Attorney, Agent, or Firm—Lawrence E. Laubscher

[57] ABSTRACT

Apparatus including an integration capacitor for integrating a given voltage relative to time, characterized by the provision of electromechanical means for simultaneously discharging said integration capacitor means when the charge voltage reaches a given value relative to a reference voltage, and for stepping a counter one step in a given direction. According to one modification of the invention, the voltage to be integrated comprises a direct-current voltage of reversible polarity, and the counter means is steppable in opposite directions, said electromechanical means being operable to compare said given voltage with a pair of reference voltages of opposite polarity for operating the appropriate one of a pair of coil and core means to simultaneously discharge said integration capacitor means and to step the counter means one unit in the appropriate direction.

9 Claims, 2 Drawing Figures

VOLTAGE INTEGRATING APPARATUS

This invention relates to apparatus for presenting an indication (either numeric or digital) of the integration of a given voltage (generally a continuous direct-current voltage) relative to time.

The use of integration capacitor means for integrating a given direct-current voltage relative to time is, of course, well known in the patented prior art. Such integration means have utility when the measurement of a given quantity is obtained in the form of a continuous voltage, as for example in measuring speed in a given time of vessel to afford an indication of the distance covered, or measuring the flow rate of a fluid to indicate total volume discharged. Since each capacitor means cannot be charged indefinitely, it is customary to effect periodic discharge of said capacitor means each time the charge voltage thereof reaches a certain level corresponding to one unit of the integrated value. The capacitor discharge means must operate quite rapidly, because during the discharge time, no integration is taking place. For this reason, it is generally proposed to use relatively complex and expensive electronic circuit means for discharging the integration capacitor means. It is furthermore necessary, during each of the repetitive discharge steps, to activate associated indicating display or counter means by one unit, thereby normally requiring relatively expensive counter circuitry. In accordance with the present invention, the cost of the prior voltage integrating systems is reduced, and the operation thereof is simplified by the use of electromechanical means, whereby the cost of the apparatus is reduced at least to that of a commercially available electrical counter.

Accordingly, a primary object of the present invention is to provide improved apparatus for integrating a given voltage relative to time, use being made of electromechanical means for simultaneously discharging integration capacitor means to which the given voltage is supplied, and for stepping associated counter means by one step. The means fo discharging the integration capacitor means includes normally-open switch means connected across said integration capacitor means, the contacts of said switch means being completely isolated from ground. The electromechanical means for simultaneously closing said switch means and for stepping said counter means includes a stationary electromagnetic coil and associated movable core, which core is connected with the movable switch contact and with the input shaft of the counter means.

A further object of the present invention is to provide means for integrating relative to time a given direct-current voltage the polarity of which is reversible under certain conditions of measurement. Use is made of a counter that is steppable in opposite directions. A pair of comparison means are provided for comparing said given voltage with a pair of reference voltages of opposite polarity, and for operating the appropriate one of a pair of coil and core means to step the counter means in a given direction and to simultaneously discharge the integration capacitor means.

In accordance with the present invention, the voltage to be measured is applied to integration capacitor means via a high-gain high-input impedance amplifier across the input and output terminals of which the integration capacitor means are connected in phase opposition. Preferably, the voltage to be measured is applied to the input terminal of said amplifier means via an input resistor having an appropriate resistance value. The charge current of the capacitor will be proportional to the voltage applied at the input of the resistor, the integration factor being dependent only on the capacity of the capacitor and on the value of the resistor as viewed from the input of the amplifier. The amplifier output voltage (which, owing to the high gain of the amplifier, is practically equal to the voltage at the terminals of the integration capacitor means), is compared with a reference voltage by comparison means including trigger means that are sharply tripped from one condition to another when the voltage to be compared exceeds slightly a given value relative to the reference voltage.

The reference voltage may be supplied from a suitable source, such as a reference diode, from the amplifier power supply (assuming that it is sufficiently stable), or from a voltage source upon which is impressed a signal operable to perform a given integral function. The comparison means may include an amplifier stage for activating the electromagnetic count indicating means.

The electromechanical means of the present invention preferably includes relay means having a stationary coil, and a movable core or armature member arranged to operate the ratchet drive shaft or corresponding input means of a step-by-step counter. Furthermore, in accordance with the present invention, the core or armature member is connected to operate simultaneously the means for discharging the integration capacitor means. In the disclosed invention, the capacitor discharge means includes normally open switch means connected across the integration capacitor means, thereby affording the advantage that the movable and stationary contacts of said switch means are isolated from ground. The precision of such a device is limited primarily by the response time of the relay means and the time for closing the switch means. This time is reduced to a minimum by the selection of the appropriate electromechanical means the relay of which has a weak inductance coil and a resistance which receives a large current impulse that is supplied from a high-capacity capacitor. This capacitor is normally continuously chaged by an auxiliary source of direct-current power via a resistor having such a resistance value that, at maximum counting cadence, the sufficiently large voltage is provided at the terminals of the condenser. In this way, the current drain upon the power supply source is minimized (i.e. the peaks of the current drain).

The integrating apparatus normally functions only when the voltage to be integrated has a polarity that corresponds with the polarity of the reference voltage. In order to permit the integration with respect to time of a given voltage the polarity of which reverses periodically, there are provided, in accordance with another modification of the invention, counter means that are steppable in opposite directions to increase and decrease the unit count, respectively, a pair of reference voltages of opposite polarities, respectively, and comparison means for comparing said given voltage with said reference voltages. When the voltage on the integration capacitor means reaches a given value relative to one of the reference voltages, a corresponding one of a pair of relay means is operable to simultaneously discharge the integration capacitor means and to step the counter means in the apropriate direction.

Figure 2:
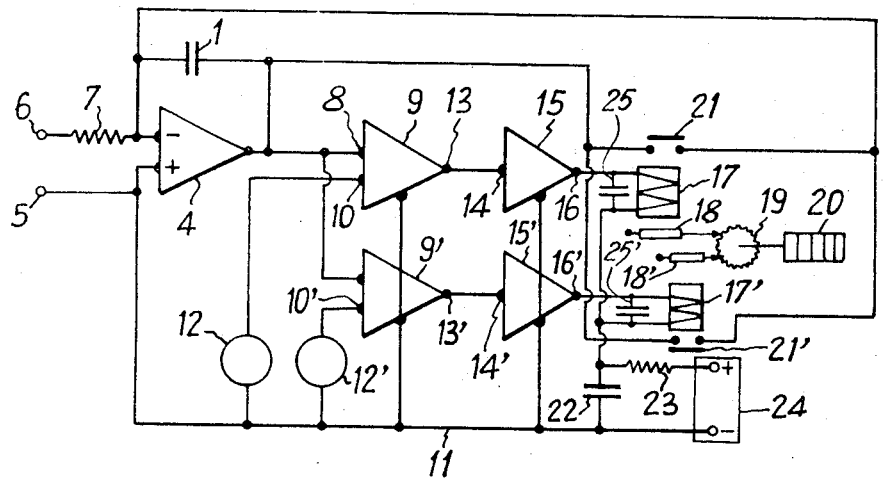

Other objects and advantages of the invention will become apparent from a study of the following specification when viewed in the light of the accompanying drawing, in which:

FIG. 1 is an electrical schematic diagram of a voltage integration circuit of the present invention for integrating relative to time a direct-current voltage of a given polarity and relatively slowly changing amplitude; and FIG. 2 is an alternate embodiment of the invention for integrating a direct-current voltage of reversible polarity.

Referring first to FIG. 1, the integration capacitor 1 is connected between the input terminal 2 and output terminal 3 of the high input impedance direct voltage amplifier 4. The voltage to be integrated is applied across input terminals 5 and 6 and is supplied to input terminal 2 via input resistor 7 having a relatively high resistance. The amplifier output terminal 3 is connected to one input terminal 8 of voltage comparator means 9 which comprises a high-gain direct-voltage amplifier. Reference voltage source 12 is connected between ground 11 and the other comparator input terminal 10 for supplying thereto direct current voltage of a given polarity and a relatively constant amplitude.

The voltage comparator output terminal 13 is connected with the input terminal means of trigger amplifier means (for example, a silicon controlled rectifier) having a first power circuit electrode 16 connected with ground via relay coil 17 and capacitor 22, and a second power circuit electrode directly connected with ground. Associated with relay coil 17 is an armature or movable core member 18 that is operable to close the normally open contacts of integration capacitor discharge switch and to simultaneously operate ratchet means 19 to step counter means 20 by one step. Discharge circuit means including switch 21 is connected across the terminals of the integration capacitor 1, the stationary and movable contacts of said switch means being completely isolated from ground.

The capacitor 22 is a high-capacity capacitor across which a charging voltage is applied from auxiliary power supply 24 via resistor 23. Auxiliary capacitor 25 is connected in parallel across the relay coil 17.

In operation, voltage to be integrated is applied across input terminals 5 and 6, and integrating capacitor 1 begins to charge. The integration factor thus depends only on the capacity of the capacitor and on the resistance value of the input resistor 7 as viewed from the input of the amplifier 4. In view of the high gain of amplifier 4, its output voltage at terminal 3 is substantially equal to the charging voltage appearing across integration capacitor 1. This integration voltage is compared by comparator means 9 with the reference voltage supplied by source 12, and when the integration voltage reaches a given value relative to the reference voltage, an output voltage appears at terminal 13 that triggers the trigger amplifier means 15, whereupon high capacity capacitor 22 supplies a high energy impulse to ground via relay coil 17 and the power circuit electrodes of trigger means 15. The capacity of capacitor 22 is so large that the capacitor functions as a stable source, the charging resistor 23 having such a value as to ensure the recharging of capacitor 22 between successive impulses at maximum counting cadence.

The current impulse flowing through relay coil 17 attracts armature 18 to operate ratchet 19 to advance counter means 20 by one unit, and simultaneously therewith switch 21 is closed to discharge the integration capacitor means 1 via the short-circuit path established across the terminals of integration capacitor 1. At the end of the impulse flowing through coil 17, the armature returns to its initial position, thereby opening the switch 21 to enable recharging of the capacitor 1, and enabling counter 20 for a further stepping operation. When the integration capacitor rises again to the given value relative to the reference voltage, the simultaneous discharge and counting steps are repeated.

The integrator means of FIG. 1 are designed for measuring with respect to time a direct-current voltage of a given polarity. In the case of a given voltage to be measured which has a reversible polarity, the embodiment of FIG. 2 is provided, like reference numerals being used on those elements common to the circuit of FIG. 1. In this embodiment, the counter means 20 is operable in opposite directions to add and subtract units from the indicated count, respectively. A second reference voltage source 12' is provided for supplying a direct-current reference voltage of a polarity opposite to the reference voltage supplied by reference voltage source 12. This second reference voltage is applied to one input terminal of second comparator means 9', the other input terminal of which is connected with the output terminal of amplifier 4 and the corresponding terminal of integration capacitor means 1. The output terminal 13' of the second comparator 9' is connected with the input terminal of second trigger means 15', said trigger means including one power circuit electrode directly connected with ground and another power circuit electrode 16' that is connected with ground via the coil 17' of second relay means, and capacitor 22. Armature 18' is operable by coil 17' to rotate ratchet means 19 in the direction opposite from which it is rotated by armature 18, thereby to subtract a unit from the counter. Simultaneously with the operation of the counter in this opposite direction, the second capacitor discharge switch 21' is closed to discharge the integration capacitor means 1.

In order to maintain the integration capacitor discharge means activated for a sufficient period of time to assure complete discharge of the capacitor 1, auxiliary capacitor means 25 and 25' are connected in parallel across the relay coils 17 and 17', respectively. Referring, for example, to FIG. 1, it will be seen that when the trigger means 15 is in the tripped condition to discharge capacitor 22 to ground via relay coil 17 and the power circuit electrodes of trigger means 15, switch 21 is closed to initiate discharge of capacitor 1. If the trigger means 15 should reset to open switch 21 before capacitor 1 has been completely discharged, the charge remaining on the integrating capacitor will deleteriously affect subsequent voltage integrations with respect to time. However, by providing the auxiliary capacitor 25 in parallel across the coil 17, the capacitor 22 is discharged by the trigger means 15, and consequently after trigger means 15 has reset to break the discharge path of capacitor 22, capacitor 25 will discharge to energize relay coil 17 and to maintain contact 21 closed for a sufficient period of time to effect complete discharge of the integration capacitor means 1. The operation of the auxiliary capacitor means 25' of FIG. 2 is the same as that described with regard to FIG. 1.

The apparatus of the present invention thus affords the very important advantage that the conventional count indicating means serves also to perform a logic control function.

While in accordance with the Patent Statutes I have illustrated and described the preferred forms and embodiments of the invention, it will become apparent to those skilled in the art that other changes may be made without deviating from the inventive concepts.

What is claimed is:

1. Apparatus for integrating an input voltage relative to time, comprising
   a. an integration capacitor;
   b. means for charging said integration capacitor with said input voltage, said capacitor charging means including a high-impedance amplifier having input and output terminals across which said integration capacitor means is connected;
   c. a reference voltage source;
   d. a normally-open short-circuit switch connected in parallel with said integration capacitor means across said input and output terminals, the contacts of said short-circuit switch being isolated from ground, said switch being operable to completely discharge said integrating capacitor means;
   e. a step-by-step counter;
   f. a normally de-activated relay including a stationary relay coil and a movable armature operable to step said counter by one unit count and simultaneously to close said short-circuit switch, thereby to completely discharge said integrator capacitor; and
   g. means including voltage comparison means for activating said relay when the instantaneous charge voltage of said integration capacitor reaches a predetermined value relative to said reference voltage.

2. Apparatus as defined in claim 1, and further including auxiliary capacitor means connected in parallel with said coil for assuring positive closure of said short-circuit switch for a sufficient period of time to effect complete discharge of said integration capacitor.

3. Apparatus as defined in claim 1, wherein said means for activating said electromechanical means further includes normally de-activated trigger circuit means including a pair of power circuit electrodes connected with the terminals of said relay coil, respectively, and a control electrode connected with output terminal of said voltage comparison means.

4. Apparatus as defined in claim 3, wherein said trigger circuit means further includes a relay capacitor connected with the relay coil of said electromechanical means, and a further voltage source for applying a charging voltage across said relay capacitor, whereby upon activation of said trigger circuit means, said relay capacitor discharges to energize said relay coil.

5. Apparatus as defined in claim 4, and further including auxiliary capacitor means connected in parallel across said coil for assuring positive closing of said short-circuit switch for a sufficient period of time to effect complete discharge of said integration capacitor.

6. Apparatus for integrating relative to time an input voltage including signals of opposite polarity, comprising
   a. an integration capacitor;
   b. means for charging said integration capacitor with said input voltage, said capacitor charging means including a high-impedance amplifier having input and output terminals across which said integration capacitor is connected;
   c. a reference voltage source for supplying first and second direct-current reference voltages of opposite polarity, respectively;
   d. a reversible step-by-step counter steppable in opposite directions for adding and subtracting unit counts from a total count;
   e. normally-open short-circuit switch means connected in parallel with said integration capacitor across said amplifier input and output terminals, said short-circuit switch means being operable to short-circuit and thereby completely discharge said integration capacitor;
   f. a pair of normally de-activated electromechanical means one of which is operable to close said short-circuit switch means and simultaneously to step the step-by-step counter one step in one direction, the other of said electromechanical means being operable to close said short-circuit switch means and simultaneously to step the step-by-step counter means one step in the opposite direction; and
   g. voltage comparison means connected with said reference voltage source for activating one of said electromechanical means when said input voltage has one polarity and said integration capacitor is charged to a given value relative to said first reference voltage, said voltage comparison means being operable to activate the other of said electromechanical means when said input voltage has the opposite polarity and said integration capacitor is charged to a second value relative to said second reference voltage.

7. Apparatus as defined in claim 6, wherein said first electromechanical means comprises a relay including a stationary first relay coil and a first movable armature associated with said first relay coil, said first armature being operable to step said comparison in one direction, said voltage comparison means including first means having a pair of input terminals connected with said integration capacitor and with the source of said first reference voltage, respectively, said first voltage comparison means having an output terminal connected with said first relay coil.

8. Apparatus as defined in claim 7, wherein said second electromechanical means comprises a stationary second relay coil, and a second movable armature associated with said second relay coil, said second armature being operable to step said counter in the opposite direction, said voltage comparison means including second comparison means having a pair of input terminals connected with said integration capacitor and with the source of said second reference voltage, said second voltage comparison means having an output terminal connected with said second relay coil.

9. Apparatus as defined in claim 8, and further including auxiliary capacitor means connected in parallel with at least one of said first and second relay coils for assuring positive activation of the associated capacitor discharge means for a sufficient time to effect complete discharge of said integration capacitor.

* * * * *